March 31, 1931.   M. PILLARD   1,798,628
DRIVING MECHANISM FOR AEROPLANES
Filed Nov. 2, 1929   2 Sheets-Sheet 1
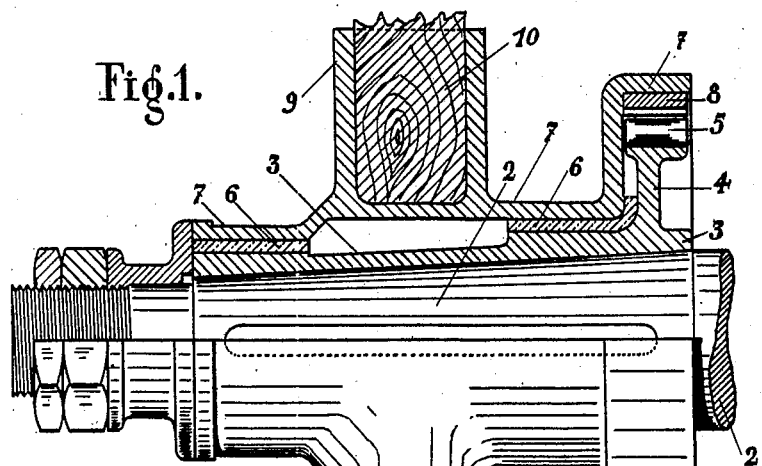
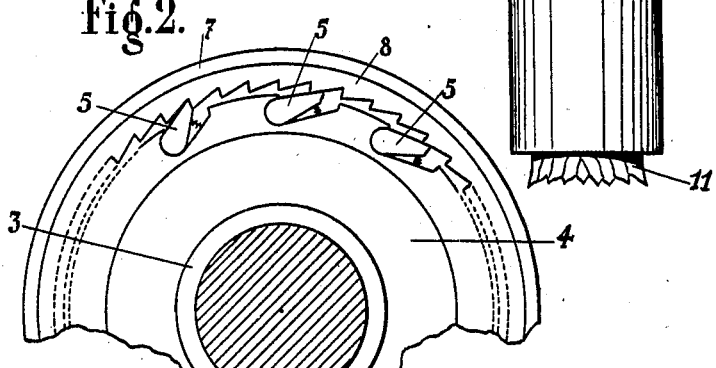
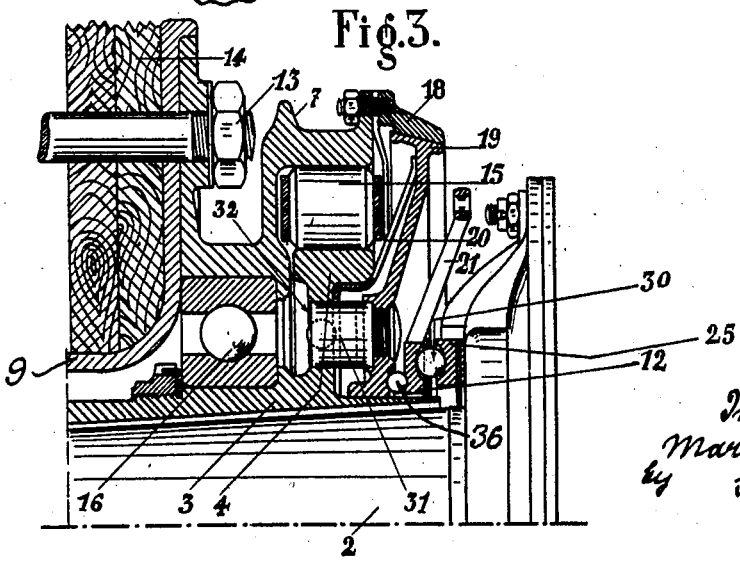

March 31, 1931.  M. PILLARD  1,798,628
DRIVING MECHANISM FOR AEROPLANES
Filed Nov. 2, 1929   2 Sheets-Sheet 2
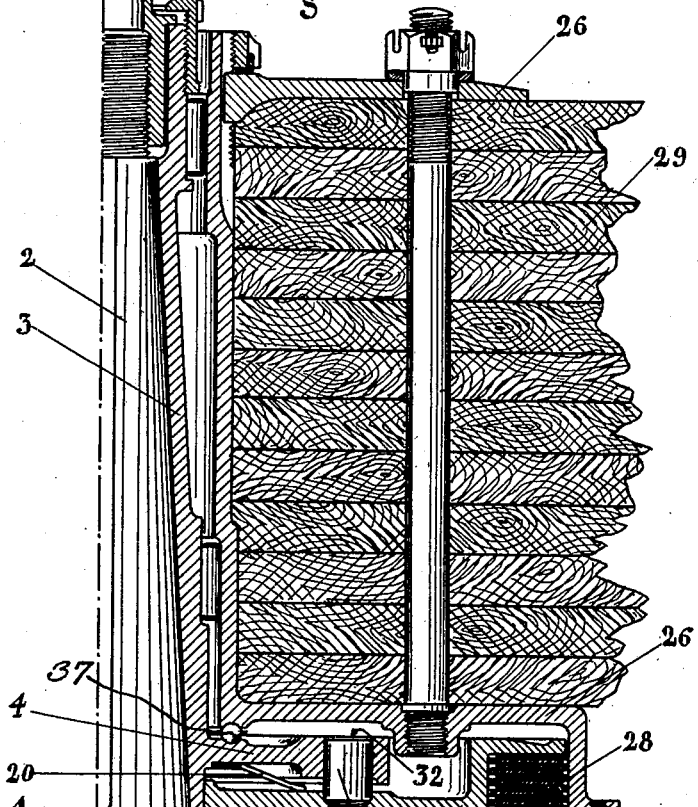
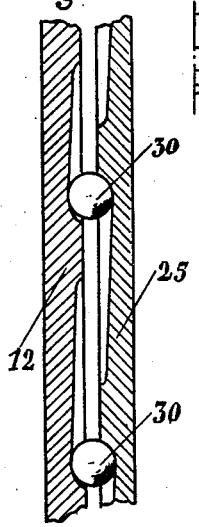
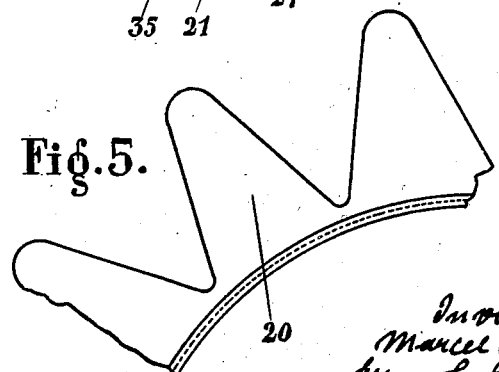

Patented Mar. 31, 1931

1,798,628

UNITED STATES PATENT OFFICE

MARCEL PILLARD, OF MARSEILLE, FRANCE, ASSIGNOR, BY MESNE ASSIGNMENTS, TO L'HELICE METALLIQUE, BREVETS PAULHAN-PILLARD, SOCIETE ANONYME, OF MARSEILLE, FRANCE

DRIVING MECHANISM FOR AEROPLANES

Application filed November 2, 1929, Serial No. 404,495, and in France November 17, 1928.

The present invention relates to a driving mechanism for aeroplanes and more particularly to screw propeller driven aircraft provided with more than one propeller and more than one motor.

It is known in connection with multimotored aircraft having more than one propeller to combine the motors with the propellers in such manner that they jointly drive the same propeller and the stoppage of either motor automatically disconnects this motor from the propeller while the remaining motor or motors remain connected therewith, the motor so disconnected being automatically connected again to the propeller when the motor is started or speeded up.

The object of the present invention is to provide improved means for coupling and uncoupling a motor to a propeller. With these ends in view the invention consists in the parts, improvements and combinations hereinafter described with reference to certain specific embodiments and more particularly pointed out in the appended claims.

The drawings show three embodiments of the invention by way of example.

Fig. 1 shows the first embodiment in a sectional elevation of a propeller hub provided with a free wheel clutch.

Fig. 2 is a front view of the free wheel clutch shown in Fig. 1.

Fig. 3 shows in sectional elevation the second embodiment of the invention.

Fig. 4 shows a detail of the device for manually operating the friction clutch shown in Fig. 3.

Fig. 5 shows a detail of the return spring used in the friction clutch.

Fig. 6 is an axial section through the third embodiment.

Referring first to Figs. 1 and 2, the motor shaft 2 has fixed thereto a sleeve 3 carrying at the right-hand end the inner portion of a free wheel clutch, namely a disc 4 integral with said sleeve having spring actuated pawls 5 mounted in recesses in the periphery of the disc as more clearly shown in Fig. 2. A propeller hub 7, carrying in sockets 9 the propeller blades 10 and 11, is losely mounted on bushings 6 so that it can freely rotate upon the shaft 2. The right-hand end of the hub 7 is provided with a lateral rim formed with internal teeth 8 adapted to co-operate with the pawls 5 of the free wheel clutch. In normal operation the shaft 2 drives the propeller hub and blades through the free wheel clutch. Upon the shaft 2 stopping from any cause, the propeller hub may continue rotating under the action of the wind pressure without dragging the shaft 2. The advantages of the invention result from the direct drive of the propeller through a friction clutch directly interposed between the driving end of the shaft and the hub.

Referring to Figs. 3, 4 and 5 showing the second embodiment of the invention, the driving shaft 2 carries upon its conical driving end a keyed sleeve 3 with which is integral a part 4 of a free wheel clutch or uni-directional drive of the known jamming roller type. The jamming rollers 15 slide on suitable cam surfaces of the member 4 and cooperate with an external drive member 7 which is fixed by means of bolts 13 to the propeller hub 9 carrying the propeller blades 14. A rolling friction bearing 16 is interposed between the parts 7 and 9 on the one hand and the sleeve 3 so that the propeller hub together with the outer drive member 7 may rotate upon the sleeve 3 but is not capable of axial movement thereon. Screwed to an annular extension of the drive member 7 is the outer part 18 of a friction clutch, the inner part 19 of the friction clutch being slidably mounted upon the sleeve 3 and guided by means of pins 31 in axial holes 32 of the part 4, whereby the clutch member 19 is prevented from rotation relatively to part 4 and the sleeve 3. A spring 20, shown in detail in Fig. 5, is interposed between the part 4 and the part 19 and tends to move the part 19 into contact with part 18 to throw in the friction clutch. Upon the sleeve 3 is mounted a disc 12 having an arm 21 for manual operation. A rolling friction bearing 36 is interposed between the disc 12 and the part 19 of the friction clutch. Fixed to a stationary part of the frame is a rim 25 having special cam races as shown in Fig. 4 co-operating with corresponding cam races in the disc 12, balls 30 being inserted in two co-operating races. Upon the disc 12 being turned manually by means of the arm 21, the disc will, owing to the action of the cam races 12, 25 and the ball 30, move axially fore and aft, and will move the inner friction clutch member 19. The operation is as follows:

During normal drive the friction clutch 18, 19 is thrown out by suitable adjustment of the arm 21, and the propeller is driven through the uni-directional drive 4, 15, 7. Upon the stopping of the motor from any cause, the propeller may continue rotating under wind pressure without dragging the motor, running loosely upon the bearing 16. If it is desired to couple the propeller to the driving shaft 2, either for cranking the motor or to operate the propeller acting as fly wheel, the friction clutch 18, 19 is thrown in by reverse action of the hand lever 21, the throwing in being assisted by the spring 20.

Referring now to Fig. 6 which shows the third embodiment of the invention, the motor shaft 2 has upon its conical driving end a fixed sleeve 3 formed at one end with a disc 4. Upon the sleeve 3 is axially and rotatably movable a propeller hub 26, two rolling friction bearings 37 being interposed between the propeller hub and the sleeve 3. In the propeller hub are mounted the propeller blades 29. Fixed to one end of the propeller hub is the outer part 27 of a multi-plate friction clutch 28. The inner part 35 of the multi-plate friction clutch is slidably mounted upon the sleeve 3 and held against rotation relatively to the sleeve by being guided by means of pins 31 in axial holes 32 of the disc 4. A spring device 20 constantly tends to throw the friction clutch in by moving the clutch member 35 to the right. A disc 12 having an arm 21 for manual operation, on being turned receives an axial movement by means of special races 12, balls 30 and special races 25 provided in a stationary member, this arrangement being similar to that shown in Fig. 4. A rolling friction bearing 38 is interposed between the inner clutch member 35 and the disc 12. The operation is as follows:

Normally shaft 2 drives the propeller hub 26 through the friction clutch 28, the axial movement of the propeller holding the friction clutch closed. Upon the shaft 2 stopping from any cause, the axial movement of the propeller upon the shaft 2 opens the friction clutch so that the propeller can continue rotating without dragging the motor. In order to clutch the propeller to the shaft 2 for the purpose of cranking the motor or any other purpose, the friction clutch may be thrown in by adjustment of the lever 21, the inner part 35 of the friction clutch being then moved by the spring 20 to throw in the clutch.

The advantages of this embodiment of the invention result from the direct drive between motor and propeller, the easy manipulation of the lever 21, and the automatic action of the propeller upon a gradually acting friction clutch.

I claim:

1. In screw propeller driven aircraft the combination of: a driving shaft; a screw propeller hub loosely mounted upon said shaft to rotate thereon; a free wheel clutch interposed between the said hub and the said shaft, whereby the said hub can be driven from said shaft in one direction only; a frictional clutch between said hub and said shaft by means of which movement from the shaft may be transmitted to the hub and vice versa in either direction; spring means constantly tending to throw-in said friction clutch; and manually operable means, operable at will by the driver, for releasing said friction clutch against the action of said spring means, substantially as described.

2. In a screw propeller driven aircraft the combination of: a driving shaft; a screw propeller hub loosely mounted upon said shaft to rotate thereon; a uni-directional drive interposed between said shaft and said hub, whereby said hub may be driven from said shaft in one direction only, said uni-directional drive being of the jamming roller type; a rolling friction bearing interposed between said hub and said shaft; a friction coupling for coupling said hub to said shaft; springs means constantly tending to throw-in said friction coupling; and hand operable means for releasing said friction coupling against the action of said spring means, said hand operable means comprising a disc turnably mounted upon said shaft; an arm on said disc adapted to be operated by hand; a rolling friction bearing between said disc and the said friction clutch; cam grooves on said disc; a stationary member provided with cam grooves co-operating with said first cam grooves; and balls movable in co-operating cam grooves, substantially as described.

3. In screw propeller driven aircraft the combination of: a driving shaft; a screw propeller hub rotatably mounted upon said shaft; a rolling friction bearing interposed between said hub and said shaft; a uni-directional drive interposed between said hub and said shaft, said uni-directional drive comprising an annular lateral rim formed upon the screw propeller hub, a disc carried by the shaft and jamming rollers interposed between said rim and said disc; a friction clutch between said hub and said shaft, said friction clutch comprising an external member carried by the hub and a sliding member mounted upon the shaft; spring means arranged arranged between the uni-directional drive and the inner friction clutch member tending to hold the friction clutch in its operative position; and hand operable means for moving the inner friction clutch member against the action of the spring to release the friction clutch, substantially as described.

4. In screw propeller driven aircraft the combination of: a driving shaft; a sleeve keyed to said shaft; a rolling friction bearing mounted upon said sleeve; a screw propeller hub mounted upon said rolling friction bearing; a disc formed upon said sleeve and constituting the inner portion of a uni-directional drive between said shaft and said hub; a lateral rim formed upon said hub and forming the outer portion of said drive; jamming rollers interposed between said disc and said rim; an outer portion of a friction clutch fixed to said rim; an inner portion of a friction clutch mounted to slide axially upon said sleeve; a spring device tending to hold said inner friction clutch member in engagement with said outer friction clutch member; a stationary member having cam grooves; a disc rotatable upon said sleeve and having an arm for manual operation; cam grooves upon said disc; balls interposed between the cam grooves of the disc and the stationary cam grooves; and a rolling friction bearing interposed between the inner member of the friction clutch and the hand operable disc, substantially as described.

5. In screw propeller driven aircraft the combination of: a driving shaft; a screw propeller hub rotatably and axially movable on said shaft; a friction clutch interposed between said hub and said shaft, said friction clutch being adapted to be thrown-in by the longitudinal movement of the screw propeller hub upon the shaft when the screw propeller is driven by the shaft; spring means constantly tending to throw-in the said friction clutch; and hand operable means for releasing the said friction clutch against the action of said spring means, substantially as described.

6. In screw propeller driven aircraft the combination of: a driving shaft; a sleeve keyed to said shaft; a screw propeller hub mounted upon said sleeve to slide thereon axially and to rotate thereon; a friction clutch of the multiple plate type interposed between one end of the screw propeller hub and the shaft, one half of said multiple plate friction clutch being directly fixed to the hub and longitudinally and rotatably movable therewith and the other half of the friction clutch being slidably mounted upon said sleeve; a spring device constantly tending to move the slidable inner portion of the friction clutch into contact with the outer portion of the friction clutch; and hand operable means for moving said portion of the friction clutch in the opposite direction against the action of the spring device, substantially as and for the purpose described.

7. In screw propeller driven aircraft the combination of: a driving shaft; a screw propeller hub axially and rotatably movable on said shaft; a multiple plate friction clutch directly interposed between said hub and said shaft; one half of said friction clutch being directly fixed to the hub in such manner that it moves towards the other half of the clutch upon the propeller hub being driven by the shaft; the other half of the multiple friction clutch being axially movable upon the shaft; spring means tending to throw-in the said multiple friction clutch; and hand operable means for releasing the clutch against the action of the spring operated means, said hand operable means comprising a disc carrying an arm for hand operation and cam operated means for axially moving the disc upon its rotation, substantially as described.

In testimony whereof, I have affixed my signature.

MARCEL PILLARD.